(No Model.)
W. L. E. KEUFFEL.
STEEL TAPE MEASURE.
No. 521,960.        Patented June 26, 1894.
Fig: 1.
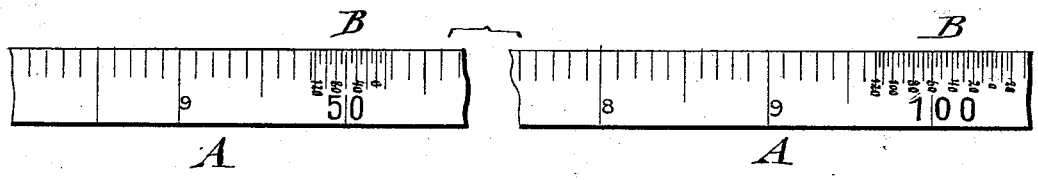
Fig: 2.
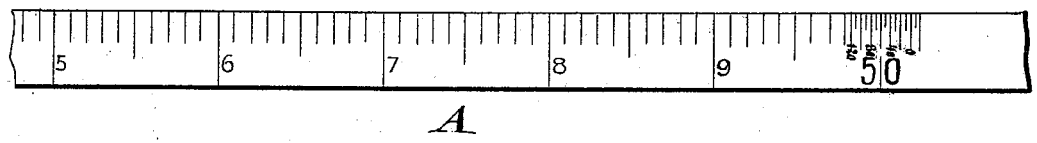
Fig: 3.
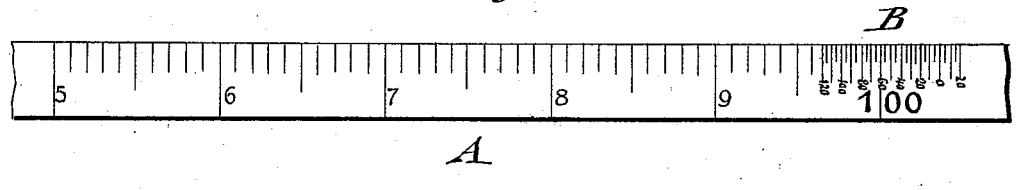
WITNESSES:
K. R. Brennan
J. Graef
INVENTOR
Willie L. E. Keuffel
BY
Foerner & Jaegener
ATTORNEYS.

UNITED STATES PATENT OFFICE.

WILLIE L. E. KEUFFEL, OF HOBOKEN, NEW JERSEY.

STEEL TAPE-MEASURE.

SPECIFICATION forming part of Letters Patent No. 521,960, dated June 26, 1894.

Application filed January 23, 1894. Serial No. 497,754. (No model.)

*To all whom it may concern:*

Be it known that I, WILLIE L. E. KEUFFEL, a citizen of the United States, residing in the city of Hoboken, in the county of Hudson and State of New Jersey, have invented certain new and useful Improvements in Steel Tape-Measures, of which the following is a specification.

This invention relates to an improved steel tape or chain, which is provided at the end of the one hundredth foot, or of fifty feet and one hundred feet, with a so-called temperature-compensating scale, by means of which the extension and contraction to which steel tapes are subjected are readily indicated and the real length of fifty or one-hundred feet at a certain temperature read off and noted directly from the tape or chain.

The Office of Weights and Measures and the United States Coast and Geodetic Survey have adopted 62° Fahrenheit as the "standard" temperature at which a steel tape or bar should measure its supported length. If therefore a steel tape one hundred feet long, supposed or ascertained to be the correct length at this standard temperature, were used with the temperature at 12° Fahrenheit, the tape would in reality then only measure $100 - 0.00006 \times 50° \times 100$ feet $= 99.97$ feet. Measures taken with it would therefore be cumulatively erroneous to the extent of one in three thousand three hundred and thirty-three, which for a mile would make a total error of 1.584 feet, and would have to be subjected to a temperature correction if anything like precision were required. As a difference of temperature of 50° and more in the short space of a month and even less, is not an unusual occurrence in a country where a difference of 30° between two consecutive days is often experienced, it will be seen that this factor of expansion should not be ignored.

For this purpose my invention consists of a steel tape or chain, which is provided at the fifty or one hundred foot mark with a temperature-compensating scale that extends in opposite directions from the fifty or one hundred foot mark, the center line being the standard temperature of 62°.

In the accompanying drawings,—Figure 1 represents a steel tape showing the temperature-compensating scale applied to the fifty and one hundred foot marks. Fig. 2 represents the end of a fifty foot tape-line, with the temperature-compensating scale at the fifty foot mark, and Fig. 3 represents the end portion of a one-hundred foot steel tape, with the temperature-compensating scale at the one hundred foot mark.

Similar letters of reference indicate corresponding parts.

Referring to the drawings, A represents a steel tape or chain either fifty or one-hundred feet in length, provided at the fifty or at the one-hundred foot mark, or, in the one-hundred foot tape or chain, at both marks, with a temperature - compensating scale B, by means of which the correction for temperature may be made while a measurement is being taken, so that subsequent calculations are made unnecessary.

The temperature-compensating scale B is a finely-graduated scale which extends from the fifty or one hundred foot mark, which is assumed to correspond to the standard temperature of 62°, said compensating scale extending from 62° down to $-$ 20° at the right-hand side of the one hundred foot mark, and to $+$ 120° at the opposite side of the same.

The compensating scale B is a thermometric scale, made in accordance with the co-efficient of expansion of steel, which is assumed as being 0.000006 for each degree Fahrenheit, and based upon the one hundred feet, the total length of the tape, thus making 0.0006 for 1°, or 0.06 of a foot for 100°. If the temperature of the tape when being used were 80° Fahrenheit, then since the tape will have expanded by reason of the additional heat, the one hundred foot mark will be in reality at 90 80 of the small scale B; while if the temperature of the tape were reduced 40° Fahrenheit, the tape will have contracted, and the one hundred foot mark will be in reality at 40 on the small scale. By this means the correction for temperature is made without the application of the usual formula, each measurement of one hundred feet being thus precisely one hundred feet.

In order that the expansion and contraction of the steel-tape may exert an influence upon the scale B it is absolutely necessary that the indicating marks and ordinals thereof be formed directly in the body of the tape.

If it be required to measure a shorter length than one hundred feet, then the correction must be made by means of the formula above given. Thus, for a length of eighty feet and a temperature of say 92° Fahrenheit, I have $80 + (0.000006 \times 30° \times 80 \text{ feet}) = 80.0144$ feet. As the temperature is higher than the standard, the tape has expanded, so if I wish to take off the measurement of the eighty feet division, it will in reality be 80.0144 feet, but if I wish to set off eighty feet exact, then I must use the division $80 - 0.0144 = 79.9856$ feet, reading off by the actual graduations of the tape 79.98 feet and estimating as nearly as possible the position of the additional 0.0056 of a foot. For the fifty foot mark on the tape, a similar compensating scale, which is based on the same thermometric principle, is used, so that the proper length of tape or chain at the different temperatures can be directly read off, either at the fifty or one-hundred foot mark, while the other lengths have to be corrected according to the formula before-described. In this manner, the factor of expansion or contraction can be taken into account whenever measurements of great accuracy are desired to be made.

Having thus described my invention, I claim as new and desire to secure by Letters Patent—

A steel tape or chain provided at the fifty or one hundred foot-mark, or at both, with a temperature-compensating scale having its marks and ordinals formed upon the body of the tape or chain, said scale starting off from the opposite sides of the fifty or one hundred foot-mark which is to be at the standard temperature so as to indicate the correct length of the tape or chain at the various temperatures, substantially as set forth.

In testimony that I claim the foregoing as my invention I have signed my name in presence of two subscribing witnesses.

WILLIE L. E. KEUFFEL.

Witnesses:
  H. REICHE,
  EDWARD WIEMER.